(12) United States Patent
Crider et al.

(10) Patent No.: US 6,896,507 B2
(45) Date of Patent: May 24, 2005

(54) MOLD DESIGN WITH IMPROVED COOLING

(75) Inventors: Matt Crider, York, PA (US); Mike Kelly, Red Lion, PA (US)

(73) Assignee: Graham Packaging Company, L.P., York, PA (US)

( * ) Notice: Subject to any disclaimer, the term of this patent is extended or adjusted under 35 U.S.C. 154(b) by 123 days.

(21) Appl. No.: 10/426,964

(22) Filed: May 1, 2003

(65) Prior Publication Data

US 2004/0219252 A1 Nov. 4, 2004

(51) Int. Cl.[7] .......................... B29C 49/36; B29C 49/64
(52) U.S. Cl. ...................... 425/526; 249/79; 264/527; 264/543; 425/540; 425/527
(58) Field of Search ................. 425/526, 537, 425/540, 527, 806; 249/79; 264/527, 543

(56) References Cited

U.S. PATENT DOCUMENTS

| | | | | |
|---|---|---|---|---|
| 2,770,011 A | * | 11/1956 | Kelly | 249/79 |
| 3,764,250 A | * | 10/1973 | Waterloo | 425/540 |
| 4,966,544 A | * | 10/1990 | Mitake | 249/79 |
| 5,762,981 A | * | 6/1998 | Nitsche | 425/526 |
| 6,444,159 B2 | * | 9/2002 | Petre | 425/526 |
| 6,447,281 B1 | * | 9/2002 | Petre | 425/526 |

* cited by examiner

Primary Examiner—Robert B. Davis
(74) Attorney, Agent, or Firm—Venable LLP; Stuart I. Smith

(57) ABSTRACT

A mold is provided for use with a wheel-type blow mold machine, the mold being one of a plurality of molds for locating in a circular pattern on a wheel of the blow-mold machine and having a longitudinal direction for aligning tangentially with a circumferential direction of the mold wheel and a transverse direction perpendicular to the longitudinal direction. The mold has a first part and a second part. The first part has a first molding portion with a longitudinal end in the longitudinal direction of the mold and a first end portion adjoining the first molding portion at the longitudinal end of the first molding portion and having a free edge opposite the first molding portion, the free edge being non-parallel to the longitudinal direction and the transverse direction. The first part also has an outer cooling circuit located in the first end portion, and an inner cooling circuit located in the first end portion at a different location in the transverse direction than the outer cooling circuit. The inner cooling circuit is a split tube with a first passage of the split tube being for directing a cooling fluid to the first end portion and a second passage of the split tube being for directing the cooling fluid from the first end portion. The second part is separable from the first part and has a second molding portion.

20 Claims, 2 Drawing Sheets

MOLD DESIGN WITH IMPROVED COOLING

BACKGROUND OF THE INVENTION

The invention relates to a container molding process. More particularly, the invention relates to systems for cooling molds used to mold containers.

It will be understood that to form a polyolefin continuous extrusion blow-molded plastic container, a parison can be heated in an extruder, captured by a mold, and blown in the mold. Specifically, to form the cavity of the container, a parison can be extruded up into the mold and as the mold comes together, a pneumatic blow pin, for example, can pierce the parison and blow the parison up against the walls of the mold. The mold typically contains flash pockets above and below the cavity in the mold to capture the excess of the parison that is forced above and below the cavity. When the parison is blown inside the mold, it is forced into the flash pockets and portions of the parison must adhere together. The excess flash can then be cut away from the container after it is ejected from the mold.

Before the container can be ejected from the mold, it must cool to a predetermined temperature. The production rate of a blow mold machine if often limited by the amount of time needed to cool a molded container before it can be ejected from its mold.

SUMMARY OF THE INVENTION

The invention provides improved cooling of molds by using a split tube cooling loop in portions of the mold that are too small to allow the use of a conventional cooling loop.

Embodiments of the invention provide a mold for use with a wheel-type blow mold machine, the mold being one of a plurality of molds for locating in a circular pattern on a wheel of the blow-mold machine and having a longitudinal direction for aligning tangentially with a circumferential direction of the mold wheel and a transverse direction perpendicular to the longitudinal direction. The mold has a first part and a second part. The first part has a first molding portion with a longitudinal end in the longitudinal direction of the mold and a first end portion adjoining the first molding portion at the longitudinal end of the first molding portion and having a free edge opposite the first molding portion, the free edge being non-parallel to the longitudinal direction and the transverse direction. The first part also has an outer cooling circuit located in the first end portion, and an inner cooling circuit located in the first end portion at a different location in the transverse direction than the outer cooling circuit. The inner cooling circuit is a split tube with a first passage of the split tube being for directing a cooling fluid to the first end portion and a second passage of the split tube being for directing the cooling fluid from the first end portion. The second part is separable from the first part and has a second molding portion.

Other embodiments of the invention provide a wheel-type blow mold machine having a mold wheel and a plurality of molds located in a circular pattern on the mold wheel, each mold having a longitudinal direction aligned tangentially with a circumferential direction of the mold wheel and a transverse direction perpendicular to the longitudinal direction. Each mold has a first part and a second part. The first part has a first molding portion with a longitudinal end in the longitudinal direction of the mold and a first end portion adjoining the first molding portion at the longitudinal end of the first molding portion and having a free edge opposite the first molding portion, the free edge being non-parallel to the longitudinal direction and the transverse direction. The first part also has an outer cooling circuit located in the first end portion, and an inner cooling circuit located in the first end portion at a different location in the transverse direction than the outer cooling circuit. The inner cooling circuit is a split tube with a first passage of the split tube being for directing a cooling fluid to the first end portion and a second passage of the split tube being for directing the cooling fluid from the first end portion. The second part is separable from the first part and has a second molding portion.

BRIEF DESCRIPTION OF THE DRAWINGS

The invention is explained below in further detail with the aid of exemplary embodiments shown in the drawings, wherein.

DETAILED DESCRIPTION OF THE INVENTION

The invention is explained in the following with the aid of the drawings in which like reference numbers represent like elements.

Figure 1:
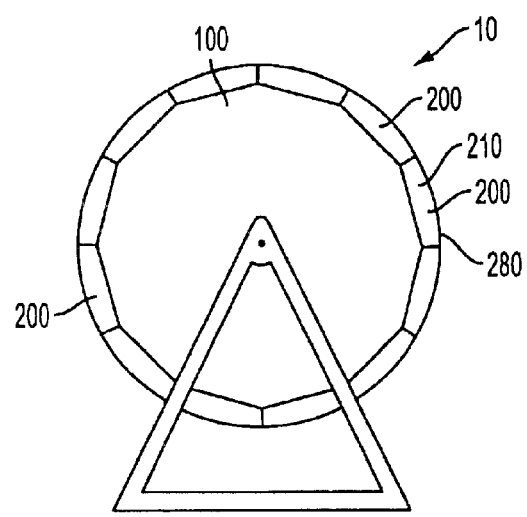
FIG. 1 is a side schematic view of a wheel-type blow mold machine in accordance with the invention.

FIG. 1 shows a schematic side view of a mold machine 10 in accordance with the invention. Mold machine 10 has a mold wheel 100 to which a plurality of molds 200 are attached. In this example, twelve molds 200 are attached to mold wheel 100. Each mold 200 has, in this example, two halves, a first half 210 and a second half 280. In this view, first half 210 is visible and obscures the view of second half 280. In this example, molds 200 are open and closed as mold wheel 100 rotates to produce containers formed by molds 200. Not shown in FIG. 1 are various elements of mold machine 10 such as, for example, extruders to supply a parison, blow air systems, cooling water systems, cam mechanisms, drive systems, and a completed container catching system.

Figure 2:
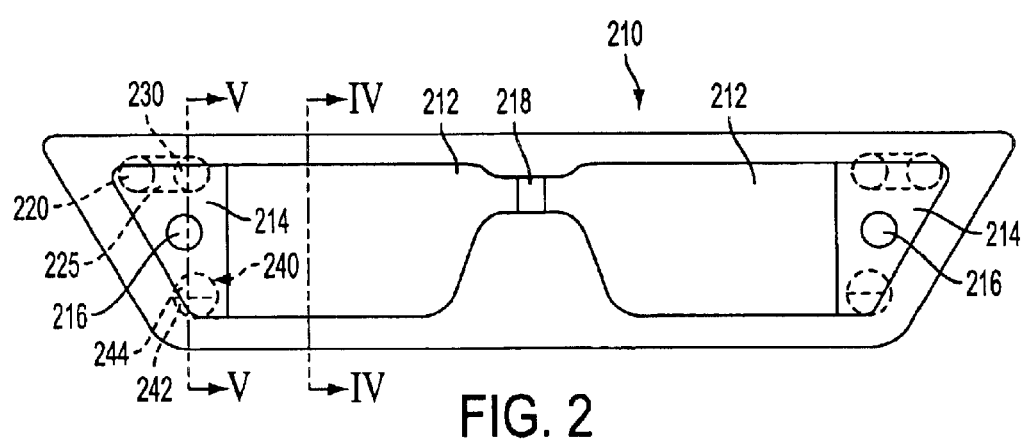
FIG. 2 is a side view of one half of a mold in accordance with the invention.

FIG. 2 shows the side of first mold half 210 that faces second mold half 280 when the mold halves are brought together to form mold 200. In this example, mold half 210 has two mold cavities 212 that, in combination with corresponding mold cavities in second mold half 280, form cavities in which two containers are formed during the molding process. Each mold cavity 212 has a corresponding base flash area 214 containing a punch out area 216 in which base flash, including a punch out, is formed during the molding process. The flash and punch out are formed from excess parison during the molding process and are used to facilitate removal of the formed containers from the mold after molding. First mold half 210 also includes a finish flash area 218 between the two mold cavities 212. Finish flash area 218 can be the site at which the parison is punctured by a blow pin in order to introduce blow air into the parison to create the molded containers.

As seen in FIG. 2, the outer perimeter of first mold half 210 is essentially a trapezoid. This trapezoidal shape results from the positioning of molds 200 around the perimeter of mold wheel 100, as shown in FIG. 1. This trapezoidal shape results in roughly triangular areas of mold half 210 outside of mold cavities 212. In each of these areas, which contains base flash areas 214, cooling tubes are run through mold half 210 to remove heat from the base area of mold cavity 212. Other cooling tubes can also run through mold half 210, but are omitted here for clarity. FIG. 2 shows an upper cooling inlet tube 230 and an upper cooling outlet tube 220 connected by an upper cooling cross tube 225. Cooling fluid is introduced through upper cooling inlet tube 230, flows through upper cooling cross tube 225 and exits first mold half 210 through upper cooling outlet tube 220. In this manner, the upper portion of the base of mold cavity 212 is cooled. As can be seen in FIG. 2, the lower portion of the base of mold cavity 212 cannot be cooled using a similar series of tubes as the upper portion because the roughly triangular shape of the area available outside of mold cavity 212 limits the area available for cooling tubes. As a result, no cooling or insufficient cooling often exists in this area.

Figure 5:
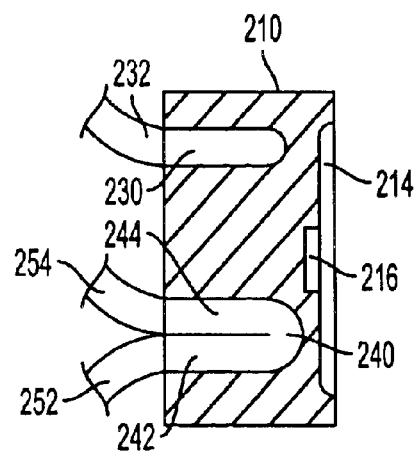
FIG. 5 is a section of the mold half shown in FIG. 2 along section line V—V.

The invention provides cooling to the lower portion of the base region by providing a lower cooling tube 240 that is split by a partition to form two separate passages. In FIG. 2, lower cooling tube 240 has a lower cooling inlet passage 242 and a lower cooling outlet passage 244. FIG. 5 shows a section of first mold half 210 along section line V—V in FIG. 2. FIG. 5 shows lower cooling tube 240 and its two cooling passages 242, 244. As can be seen in FIG. 5, cooling fluid can flow through mold half 210 by flowing through a lower coolant inlet supply pipe 252, lower cooling inlet passage 242, lower cooling outlet passage 244, and lower cooling outlet pipe 254. Also shown in FIG. 5, is upper cooling inlet supply pipe 232 that supplies cooling fluid to upper cooling inlet tube 230. As shown by FIGS. 2 and 5, the cooling problem presented by the trapezoidal shape of mold half 210 can be overcome by using a split tube such as lower cooling tube 240 to provide cooling fluid to the lower, more cramped, region near the base of mold cavity 212.

Figure 3:
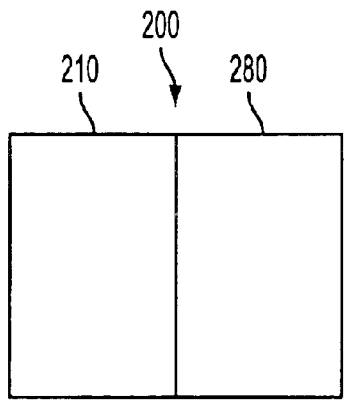
FIG. 3 is an end view of the mold half shown in FIG. 2 and a corresponding mold half.
Figure 4:
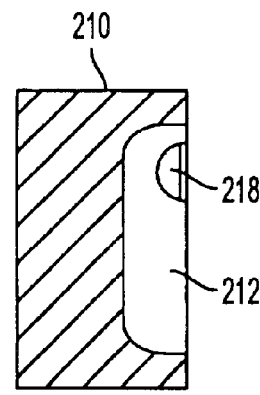
FIG. 4 is a section of the mold half shown in FIG. 2 along section line IV—IV.

As shown in FIG. 3, first mold half 210 and second mold half 280 come together to form mold 200. FIG. 4 shows a section through mold half 210 along section line IV—IV in FIG. 2.

The invention has been described in detail with respect to preferred embodiments and it will now be apparent from the foregoing to those skilled in the art that changes and modifications may be made without departing from the invention in its broader aspects. The invention, therefore, is intended to cover all such changes and modifications that fall within the true spirit of the invention.

What is claimed is:

1. A mold for use with a wheel-type blow mold machine, the mold being one of a plurality of molds for locating in a circular pattern on a wheel of the blow-mold machine and having a longitudinal direction for aligning tangentially with a circumferential direction of the mold wheel and a transverse direction perpendicular to the longitudinal direction, the mold comprising:
    a first part having
        a first molding portion with a longitudinal end in the longitudinal direction of the mold,
        a first end portion adjoining the first molding portion at the longitudinal end of the first molding portion and having a free edge opposite the first molding portion, the free edge being non-parallel to the longitudinal direction and the transverse direction,
        an outer cooling circuit located in the first end portion, and
        an inner cooling circuit located in the first end portion at a different location in the transverse direction than the outer cooling circuit,
            the inner cooling circuit being a split tube with a first passage of the split tube being for directing a cooling fluid to the first end portion and a second passage of the split tube being for directing the cooling fluid from the first end portion; and
    a second part separable from the first part and having a second molding portion.

2. The mold of claim 1, wherein the free edge of the first end portion is angled such that it is for aligning with a radial direction of the mold wheel.

3. The mold of claim 1, wherein the first part further comprises a second end portion adjoining the first molding portion such that the first molding portion is between the first end portion and the second end portion in the longitudinal direction.

4. The mold of claim 3, wherein the second end portion has
    a free edge opposite the first molding portion, the free edge being non-parallel to the longitudinal direction and the transverse direction,
    an outer cooling circuit located in the second end portion, and
    an inner cooling circuit located in the second end portion at a different location in the transverse direction than the outer cooling circuit,
        the inner cooling circuit of the second end being a split tube with a first passage of the split tube being for directing a cooling fluid to the second end portion and a second passage of the split tube being for directing the cooling fluid from the second end portion.

5. The mold of claim 4, wherein the second molding portion has a longitudinal end in the longitudinal direction of the mold, and the second part further comprises
    a first end portion adjoining the second molding portion at the longitudinal end of the second molding portion and having a free edge opposite the second molding portion, the free edge being non-parallel to the longitudinal direction and the transverse direction,
    an outer cooling circuit located in the first end portion of the second part, and
    an inner cooling circuit located in the first end portion of the second part at a different location in the transverse direction than the outer cooling circuit of the first end portion of the second part,
        the inner cooling circuit of the first end portion of the second part being a split tube with a first passage of the split tube being for directing a cooling fluid to the first end portion of the second part and a second passage of the split tube being for directing the cooling fluid from the first end portion of the second part.

6. The mold of claim 5, wherein the second part further comprises a second end portion adjoining the second molding portion such that the second molding portion is between the first end portion of the second part and the second end portion of the second part in the longitudinal direction.

7. The mold of claim 6, wherein the second end portion of the second part has
    a free edge opposite the second molding portion, the free edge being non-parallel to the longitudinal direction and the transverse direction,
    an outer cooling circuit located in the second end portion of the second part, and an inner cooling circuit located in the second end portion of the second part at a different location in the transverse direction than the outer cooling circuit of the second end portion of the second part, the inner cooling circuit of the second end portion of the second part being a split tube with a first passage of the split tube being for directing a cooling fluid to the second end portion of the second part and a second passage of the split tube being for directing the cooling fluid from the second end portion of the second part.

8. The mold of claim 7, wherein the free edge of the first end portion of the first part, the free edge of the second end portion of the first part, the free edge of the first end portion of the second part, and the free edge of the second end portion of the second part are angled such that they are for aligning with radial directions of the mold wheel.

9. The mold of claim 8, wherein the mold is a dual cavity mold and each of the first and second molding portions are a half of the dual cavity mold.

10. The mold of claim 9, wherein each of the inner cooling circuits is a split tube of circular cross section having a divider positioned along a diameter of the circular cross section.

11. A wheel-type blow mold machine comprising:
a mold wheel; and
a plurality of molds located in a circular pattern on the mold wheel, each mold having a longitudinal direction aligned tangentially with a circumferential direction of the mold wheel and a transverse direction perpendicular to the longitudinal direction, each mold comprising:
 a first part having
  a first molding portion with a longitudinal end in the longitudinal direction of the mold,
  a first end portion adjoining the first molding portion at the longitudinal end of the first molding portion and having a free edge opposite the first molding portion, the free edge being non-parallel to the longitudinal direction and the transverse direction,
  an outer cooling circuit located in the first end portion, and
  an inner cooling circuit located in the first end portion at a different location in the transverse direction than the outer cooling circuit,
  the inner cooling circuit being a split tube with a first passage of the split tube being for directing a cooling fluid to the first end portion and a second passage of the split tube being for directing the cooling fluid from the first end portion; and
 a second part separable from the first part and having a second molding portion.

12. The mold machine of claim 11, wherein the free edge of the first end portion is angled with a radial direction of the mold wheel.

13. The mold machine of claim 11, wherein the first part further comprises a second end portion adjoining the first molding portion such that the first molding portion is between the first end portion and the second end portion in the longitudinal direction.

14. The mold machine of claim 13, wherein the second end portion has
 a free edge opposite the first molding portion, the free edge being non-parallel to the longitudinal direction and the transverse direction,
 an outer cooling circuit located in the second end portion, and
 an inner cooling circuit located in the second end portion at a different location in the transverse direction than the outer cooling circuit,
 the inner cooling circuit of the second end being a split tube with a first passage of the split tube being for directing a cooling fluid to the second end portion and a second passage of the split tube being for directing the cooling fluid from the second end portion.

15. The mold machine of claim 14, wherein the second molding portion has a longitudinal end in the longitudinal direction of the mold, and the second part further comprises
 a first end portion adjoining the second molding portion at the longitudinal end of the second molding portion and having a free edge opposite the second molding portion, the free edge being non-parallel to the longitudinal direction and the transverse direction,
 an outer cooling circuit located in the first end portion of the second part, and
 an inner cooling circuit located in the first end portion of the second part at a different location in the transverse direction than the outer cooling circuit of the first end portion of the second part,
  the inner cooling circuit of the first end portion of the second part being a split tube with a first passage of the split tube being for directing a cooling fluid to the first end portion of the second part and a second passage of the split tube being for directing the cooling fluid from the first end portion of the second part.

16. The mold machine of claim 15, wherein the second part further comprises a second end portion adjoining the second molding portion such that the second molding portion is between the first end portion of the second part and the second end portion of the second part in the longitudinal direction.

17. The mold machine of claim 16, wherein the second end portion of the second part has
 a free edge opposite the second molding portion, the free edge being non-parallel to the longitudinal direction and the transverse direction,
 an outer cooling circuit located in the second end portion of the second part, and
 an inner cooling circuit located in the second end portion of the second part at a different location in the transverse direction than the outer cooling circuit of the second end portion of the second part,
  the inner cooling circuit of the second end portion of the second part being a split tube with a first passage of the split tube being for directing a cooling fluid to the second end portion of the second part and a second passage of the split tube being for directing the cooling fluid from the second end portion of the second part.

18. The mold machine of claim 17, wherein the free edge of the first end portion of the first part, the free edge of the second end portion of the first part, the free edge of the first end portion of the second part, and the free edge of the second end portion of the second part are angled such that they are aligned with radial directions of the mold wheel.

19. The mold machine of claim 18, wherein each mold is a dual cavity mold and each of the first and second molding portions are a half of one of the dual cavity molds.

20. The mold machine of claim 19, wherein each of the inner cooling circuits is a split tube of circular cross section having a divider positioned along a diameter of the circular cross section.

* * * * *